US012594534B2

(12) United States Patent
 Koga et al.

(10) Patent No.: US 12,594,534 B2
(45) Date of Patent: Apr. 7, 2026

(54) MICROCAPSULE

(71) Applicant: KAO CORPORATION, Tokyo (JP)

(72) Inventors: Yoshito Koga, Wakayama (JP);
 Daisuke Yamazaki, Wakayama (JP);
 Risa Sawada, Wakayama (JP); Keita Fukuzumi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 169 days.

(21) Appl. No.: 18/259,227

(22) PCT Filed: Dec. 28, 2020

(86) PCT No.: PCT/JP2020/049260
 § 371 (c)(1),
 (2) Date: Jun. 23, 2023

(87) PCT Pub. No.: WO2022/145017
 PCT Pub. Date: Jul. 7, 2022

(65) Prior Publication Data
 US 2024/0050918 A1     Feb. 15, 2024

(51) Int. Cl.
 *B01J 13/18* (2006.01)

(52) U.S. Cl.
 CPC ..................................... *B01J 13/18* (2013.01)

(58) Field of Classification Search
 None
 See application file for complete search history.

(56) References Cited

U.S. PATENT DOCUMENTS

| | | | |
|---|---|---|---|
| 7,758,888 | B2 | 7/2010 | Lapidot et al. |
| 2002/0037261 | A1 | 3/2002 | Lapidot et al. |
| 2002/0064541 | A1 | 5/2002 | Lapidot et al. |
| 2007/0292676 | A1 | 12/2007 | Naigertsik et al. |
| 2010/0255107 | A1 | 10/2010 | Lapidot et al. |
| 2012/0015014 | A1 | 1/2012 | Lapidot et al. |
| 2012/0202695 | A1 | 8/2012 | Toledano et al. |
| 2014/0271751 | A1 | 9/2014 | Schmidt et al. |
| 2016/0303531 | A1* | 10/2016 | Yamazaki ............... A61Q 13/00 |
| 2018/0117369 | A1 | 5/2018 | Toledano et al. |
| 2018/0339176 | A1 | 11/2018 | Toledano et al. |
| 2019/0344238 | A1 | 11/2019 | Isobe et al. |

| | | | |
|---|---|---|---|
| 2020/0330948 | A1 | 10/2020 | Cardoso et al. |
| 2020/0330950 | A1 | 10/2020 | Cardoso et al. |
| 2023/0201786 | A1 | 6/2023 | Cardoso et al. |
| 2024/0238748 | A1 | 7/2024 | Cardoso et al. |

FOREIGN PATENT DOCUMENTS

| | | |
|---|---|---|
| CN | 101530772 A | 9/2009 |
| CN | 106148005 A | 11/2016 |
| EP | 2 324 812 A2 | 5/2011 |
| JP | 53-47509 | 4/1978 |
| JP | 2000-72618 | 3/2000 |
| JP | 2003-500428 A | 1/2003 |
| JP | 2013-525564 | 6/2013 |
| JP | 2013-255915 A | 12/2013 |
| JP | 2014-532547 A | 12/2014 |
| JP | 2015-128762 A | 7/2015 |
| JP | 2015-535731 | 12/2015 |
| JP | 2017-114802 A | 6/2017 |
| JP | 2018-16547 | 2/2018 |
| JP | 2019-77624 | 5/2019 |
| WO | WO 2018/180966 A1 | 10/2018 |

OTHER PUBLICATIONS

Extended European Search Report issued Oct. 11, 2024 in European Patent Application No. 20968028.9, 9 pages.
International Search Report issued Mar. 16, 2021, in PCT/JP2020/049260 (with English Translation), 5 pages.
"cosmetic ingredient information online" published Mar. 10, 2022; https://cosmetic-ingredients.org/blending-agents/1343/ (with partial machine translation).
Notice of Written opposition mailed on Feb. 2, 2026, in corresponding Japanese Patent No. 7707206 (with English translation).

* cited by examiner

*Primary Examiner* — Jeffrey D Washville
(74) *Attorney, Agent, or Firm* — Oblon, McClelland, Maier & Neustadt, L.L.P.

(57) ABSTRACT

A microcapsule, including a shell containing an inorganic substance as a constituent component and a core containing one or more organic compounds inside the shell. The organic compound includes the following component (A): a functional oil agent, and component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms, other than the component (A).

10 Claims, No Drawings

MICROCAPSULE

CROSS REFERENCE TO RELATED APPLICATIONS

This application is a National Stage entry under 35 U.S.C. § 371 of PCT/JP2020/049260, filed on Dec. 28, 2020, incorporated herein by reference.

FIELD OF THE INVENTION

The present invention relates to a microcapsule and a method for producing a microcapsule.

BACKGROUND OF THE INVENTION

In a broad range of business fields such as cosmetics, drugs and medicines, general household products, printing, and the like, various microcapsules encapsulating fragrances or physiologically active substances therein have been developed and utilized. For example, an aminoplast resin such as a melamine resin or a polyurea/urethane resin has been used as a shell constituting the microcapsule. However, microcapsules are inevitably discharged into the environment, and in recent years, they have contributed to a substance of concern called microplastics. Therefore, it is desired to develop microcapsules with high environmental friendliness in replacement of aminoplast resin.

Among them, a silica microcapsule (hereinafter, also referred to as a "silica capsule") having a shell containing silica as a constituent component has attracted attention as a material that can be expected to have environmentally friendly.

The silica capsule is generally obtained by a method of forming silica on the surface of an emulsified droplet by a sol-gel reaction. However, since the silica capsule itself is a very fine particle, the shell of the silica capsule is also very thin and brittle. Therefore, a part of the encapsulated component may be eluted to the external environment by the collapse of the shell and the diffusion of the encapsulated component of the silica capsule through the fine pores present in the shell. Accordingly, various silica capsules using a sol-gel reaction have heretofore been studied.

For example, JP 2013-255915 A (PTL 1) describes a method for producing a microcapsule having a core material containing an active ingredient such as a sunscreen agent, the method including a step of emulsifying an oily phase composed of a water-insoluble precursor and the core material in an aqueous phase composed of an aqueous solution having a predetermined pH under appropriate shear force and temperature conditions to form an oil-in-water emulsion.

JP 2015-128762 A (PTL 2) aims at obtaining a microcapsule capable of retaining a functional oil agent as an active ingredient such as fragrance therein over a long period of time and describes a method for producing a microcapsule having a core composed of a functional oil agent such as a fragrance, a first shell clathrating the core, and a second shell clathrating the first shell, in which a first sol-gel reaction is carried out in a surfactant-containing aqueous phase in which an organic phase containing a functional oil agent and tetraalkoxysilane is emulsified, followed by a second sol-gel reaction in which tetraalkoxysilane is added and a pH lower than that in the first sol-gel reaction is maintained.

SUMMARY OF THE INVENTION

The present invention relates to a microcapsule having a shell containing an inorganic substance as a constituent component and a core containing one or more organic compounds inside the shell, in which the organic compound contains the following component (A) and component (B1):

Component (A): a functional oil agent;

Component (B1): one or more selected from the group consisting of a higher monoalcohol higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded).

DETAILED DESCRIPTION OF THE INVENTION

In the techniques of PTLs 1 and 2, it has been found that a target silica capsule in which leakage of a core component is suppressed cannot be obtained depending on an oil agent to be encapsulated, and a functional oil agent such as a fragrance cannot be retained for a long period of time in some cases.

In addition, the microcapsule is also required to be hardly collapsed and to have excellent stability in a distribution stage. The physical strength of the microcapsule also depends on the particle size of the microcapsule, and from the viewpoint of increasing the physical strength of the microcapsule, it is also required to be excellent in the controllability of the particle size capable of obtaining the microcapsule having a small particle size.

The present invention relates to a microcapsule which can retain a functional oil agent such as a fragrance to be encapsulated for a long period of time and is excellent in controllability of a particle size, and a method for producing the microcapsule.

The present inventors have found that it is possible to reduce the particle size of a microcapsule and to improve the retention of the functional oil agent by containing a functional oil agent and a component having a specific hydrocarbon group and a polar group inside a shell containing an inorganic substance as a constituent component.

That is, the present invention relates to the following [1] and [2].

[1] A microcapsule having a shell containing an inorganic substance as a constituent component and a core containing one or more organic compounds inside the shell, in which the organic compound contains the following component (A) and component (B1):

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded).

[2] A method for producing a microcapsule having a shell containing an inorganic substance as a constituent component and a core containing one or more organic compounds inside the shell, the method including a step of emulsifying an oil-water mixture containing an oil-phase component containing the following component (A), component (B1), and component (C) and an aqueous phase component and subjecting the resulting mixture to a sol-gel reaction to form the microcapsule:

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded);

Component (C): a shell precursor.

According to the present invention, it is possible to provide a microcapsule which can retain a functional oil agent such as a fragrance to be encapsulated for a long period of time and is excellent in controllability of a particle size, and a method for producing the microcapsule.

[Microcapsule]

The microcapsule of the present invention is a microcapsule having a shell containing an inorganic substance as a constituent component and a core containing one or more organic compounds inside the shell, in which the organic compound contains the following component (A) and component (B1):

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded).

In the description herein, a retention of the component (A) encapsulated in the microcapsule for a long period of time is also referred to as a "long-term retention".

Further, in the present invention, the "sol-gel reaction" means a reaction in which a shell precursor undergoes hydrolysis and polycondensation reaction to form an inorganic substance, which is a constituent component of the shell, through a sol state and a gel state. Here, the "shell precursor" means a substance capable of forming a shell of a microcapsule. As the sol-gel reaction, for example, in a silica capsule, a reaction in which tetraalkoxysilane as a shell precursor is hydrolyzed, a silanol compound generates a siloxane oligomer by a dehydration condensation reaction and a dealcohol condensation reaction, and further a dehydration condensation reaction proceeds so as to form silica is exemplified.

According to the present invention, it is possible to provide a microcapsule which can retain a functional oil agent such as a fragrance for a long period of time and is excellent in controllability of a particle size. The reason for this is not clear, but is considered to be as follows.

In the present invention, the organic compound contained in the core further contains, as the component (B1), one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms, in addition to the functional oil agent as the component (A). The component (B1) has a long-chain aliphatic hydrocarbon group and a polar group, and is highly hydrophobic. Therefore, it is considered that when the microcapsules are produced, the oil phase component of the oil-water mixture used for preparing an emulsified liquid to be subjected to the sol-gel reaction contains the component (B1), so that the polar group of the component (B1) is oriented at the interface with the aqueous phase, and there is a function of stably and finely forming emulsified droplets serving as a template for the microcapsule. Since the component (B1) is densely oriented at the interface with the aqueous phase, the shell itself has a strong structure. As a result, it is presumed that a microcapsule having a dense and strong shell is obtained, the leakage of the functional oil agent is suppressed, the long-term retention is improved, and the controllability of the particle size of the silica capsule is improved.

<Core>

(Component (A))

The organic compound contained in the core of the microcapsule of the present invention contains a functional oil agent as the component (A).

The "functional oil agent" in the component (A) is an oil agent that exhibits an effect useful for an application or purpose according to the application or purpose.

The component (A) is preferably one or more selected from the group consisting of a fragrance, a fragrance precursor, a moisturizer, an antioxidant, an antibacterial agent, a fertilizer, a surface modifier for fibers, skin, hair, and the like, a cold sense agent, a dye, a pigment, silicone, and an oil-soluble polymer, more preferably one or more selected from the group consisting of a fragrance, a fragrance precursor, a moisturizer, an antioxidant, an antibacterial agent, a fertilizer, and a surface modifier, still more preferably one or more selected from the group consisting of a fragrance, a fragrance precursor, a moisturizer, and an antioxidant, even more preferably one or more selected from the group consisting of a fragrance, a fragrance precursor, and a moisturizer, and yet still more preferably one or more selected from the group consisting of a fragrance and a fragrance precursor.

The component (A) may be used alone or in combination of two or more thereof.

Examples of the fragrance precursor include a compound that releases a fragrance component by reacting with water, and a compound that releases a fragrance component by reacting with light.

Examples of the compound that releases a fragrance component by reacting with water include a silicic acid ester compound containing an alkoxy component derived from fragrance alcohol, a fatty acid ester compound containing an alkoxy component derived from fragrance alcohol, an acetal compound or a hemiacetal compound obtained through a reaction between a carbonyl component derived from fragrance aldehyde or fragrance ketone and an alcohol compound, a Schiff base compound obtained through a reaction between a carbonyl component derived from fragrance aldehyde or fragrance ketone and a primary amine compound, and a hemiaminal compound or a hydrazone compound obtained through a reaction between a carbonyl component derived from fragrance aldehyde or fragrance ketone and a hydrazine compound.

Examples of the compound that releases a fragrance component by reacting with light include a 2-nitrobenzylether compound containing an alkoxy component derived from fragrance alcohol, an α-keto ester compound containing a carbonyl component derived from fragrance aldehyde or fragrance ketone, and a coumaric acid ester compound containing an alkoxy component derived from fragrance alcohol. These fragrance precursors may be used, for example, as a polymer such as a product of reaction between some carboxy groups of polyacrylic acid and fragrance alcohol.

The component (A) preferably has moderate hydrophobicity from the viewpoint of improving the long-term retention of the functional oil agent and from the viewpoint of improving the controllability of the particle size of the microcapsule.

As an index representing the hydrophilicity or hydrophobicity of the functional oil agent, a c Log P value, which is a calculated value of a common logarithm "Log P" of a partition coefficient P (n-octanol/water) between n-octanol and water, can be used. The c Log P value is Log P (c Log P) calculated by the method described in A. Leo Comprehensive Medicinal Chemistry, Vol. 4, C. Hansch, P. G. Sammens, J. B Taylor and C. A. Ramsden, Eds., P. 295, Pergamon Press, 1990, and is a value calculated by the program C LOG P v4.01.

When the component (A) is composed of a plurality of constituent components, the c Log P value of the component (A) can be obtained by multiplying the c Log P value of each constituent component by the volume ratio of each constituent component and calculating the sum of the products.

The c Log P value of the component (A) is preferably 1 or more, more preferably 2 or more, and still more preferably 3 or more, and is preferably 30 or less, more preferably 20 or less, and still more preferably 10 or less, from the viewpoint of improving the long-term retention of the functional oil agent and from the viewpoint of improving the controllability of the particle size of the microcapsule.

(Component (B1))

The organic compound contained in the core of the microcapsule of the present invention includes, as the component (B1), one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms, from the viewpoint of improving the long-term retention of the functional oil agent and from the viewpoint of improving the controllability of the particle size of the microcapsule. However, the component (B1) excludes the component (A).

In addition, the components (B1) may be used alone or in combination of two or more thereof.

The molecular weight of the component (B1) is preferably 500 or less, more preferably 450 or less, still more preferably 400 or less, and even more preferably 350 or less, and is preferably 150 or more, from the viewpoint of improving the long-term retention of the functional oil agent and from the viewpoint of improving the controllability of the particle size of the microcapsule.

[Higher Aliphatic Alcohol Having 6 or More Carbon Atoms]

The number of carbon atoms in the higher aliphatic alcohol is preferably 8 or more, more preferably 10 or more, still more preferably 12 or more, and even more preferably 14 or more, and is preferably 22 or less, more preferably 20 or less, and still more preferably 18 or less, from the viewpoint of improving the long-term retention of the functional oil agent and from the viewpoint of improving the controllability of the particle size of the microcapsule.

The higher aliphatic alcohol is preferably a linear or branched higher aliphatic alcohol, and more preferably a linear higher aliphatic primary alcohol.

From the viewpoint of ease of handling, the higher aliphatic alcohol is preferably in a solid state (for example, having a melting point of 30° C. or higher) at ordinary temperature and ordinary pressure. The melting point of the higher aliphatic alcohol is preferably 30° C. or higher, more preferably 35° C. or higher, still more preferably 40° C. or higher, and even more preferably 45° C. or higher.

Examples of the higher aliphatic primary alcohol include 2-ethylhexyl alcohol, lauryl alcohol, myristyl alcohol, cetyl alcohol, stearyl alcohol, behenyl alcohol, and oleyl alcohol. Among these, one or more selected from the group consisting of 2-ethylhexyl alcohol, lauryl alcohol, myristyl alcohol, cetyl alcohol, and stearyl alcohol are preferable, one or more selected from the group consisting of cetyl alcohol and stearyl alcohol are more preferable, and cetyl alcohol is still more preferable.

[Higher Fatty Acid Having 6 or More Carbon Atoms]

The number of carbon atoms in the higher fatty acid is preferably 8 or more, more preferably 10 or more, still more preferably 12 or more, even more preferably 14 or more, and yet still more preferably 16 or more, and is preferably 26 or less, more preferably 22 or less, and still more preferably 20 or less, from the viewpoint of improving the long-term retention of the functional oil agent and from the viewpoint of improving the controllability of the particle size of the microcapsule.

Examples of the higher fatty acid include 2-ethylhexanoic acid, lauric acid, myristic acid, palmitic acid, stearic acid, behenic acid, oleic acid, linoleic acid, linolenic acid, lanolin acid, and isostearic acid. Among these, branched-chain saturated fatty acids are preferable, and isostearic acid is more preferable.

[Monoalkyl Glyceryl Ether Having Alkyl Group Having 8 or More Carbon Atoms]

The number of carbon atoms of the alkyl group in the monoalkyl glyceryl ether is preferably 10 or more, more preferably 12 or more, still more preferably 14 or more, and even more preferably 16 or more, and is preferably 24 or less, more preferably 22 or less, and still more preferably 22 or less, from the viewpoint of improving the long-term retention of the functional oil agent and from the viewpoint of improving the controllability of the particle size of the microcapsule.

Examples of the monoalkyl glyceryl ether include mono-2-ethylhexyl glyceryl ether, monodecyl glyceryl ether, monolauryl glyceryl ether, monomyristyl glyceryl ether, monocetyl glyceryl ether, monostearyl glyceryl ether, and monobehenyl glyceryl ether. Among these, one or more selected from the group consisting of monocetyl glyceryl ether, monostearyl glyceryl ether, and monobehenyl glyceryl ether are preferable, and monostearyl glyceryl ether is more preferable. The monoalkyl glyceryl ether is usually an α-form.

[Amide Compound Having Alkyl Group Having 8 or More Carbon Atoms]

The number of carbon atoms of the alkyl group in the amide compound is preferably 10 or more, more preferably 12 or more, and still more preferably 14 or more, and is preferably 22 or less, more preferably 20 or less, and still more preferably 18 or less.

As the amide compound, an amide compound having an alkyl group derived from a saturated or unsaturated fatty acid is preferable. Specific examples of the amide compound include lauric acid amide, myristic acid amide, palmitic acid amide, stearic acid amide, and oleic acid amide.

From the viewpoint of improving the controllability of the particle size of the microcapsule, the component (B1) is preferably one or more selected from the group consisting of a higher fatty acid having 6 or more carbon atoms and a higher aliphatic alcohol having 6 or more carbon atoms, and more preferably a higher fatty acid having 6 or more carbon atoms.

From the viewpoint of improving the long-term retention of the functional oil agent, the component (B1) is preferably one or more selected from the group consisting of an alkyl glyceryl ether having an alkyl group having 8 or more carbon atoms and a higher fatty acid having 6 or more carbon atoms, and more preferably an alkyl glyceryl ether having an alkyl group having 8 or more carbon atoms.

The content ratio of the component (B1) to the component (A) in the microcapsule of the present invention is preferably 0.01% by mass or more, more preferably 0.1% by mass or more, still more preferably 0.5% by mass or more, and even more preferably 1% by mass or more, and is preferably 10% by mass or less, more preferably 7% by mass or less, still more preferably 5% by mass or less, and even more preferably 4% by mass or less, from the viewpoint of improving the long-term retention of the functional oil agent and from the viewpoint of improving the controllability of the particle size of the microcapsule.

The content ratio of the component (B1) to the component (A) is a content ratio when the component (A) in the microcapsule is taken as 100% by mass.
(Component (B2))

The organic compound contained in the core of the microcapsule of the present invention preferably further contains the following component (B2) from the viewpoint of improving the long-term retention of the functional oil agent and from the viewpoint of improving the controllability of the particle size of the microcapsule.

Component (B2): one or more selected from the group consisting of a fatty acid ester having a total number of carbon atoms of 6 or more and a higher alkane having 6 or more carbon atoms.

However, the component (B2) excludes the component (A).

The c Log P value of the component (B2) is preferably 4 or more, more preferably 5 or more, still more preferably 6 or more, and even more preferably 7 or more, and is preferably 10 or less, and more preferably 9 or less, from the viewpoint of improving the long-term retention of the functional oil agent and from the viewpoint of improving the controllability of the particle size of the microcapsule.
[Fatty Acid Ester Having Total Number of Carbon Atoms of 6 or More]

The total number of carbon atoms in the fatty acid ester is 6 or more, preferably 10 or more, more preferably 14 or more, and still more preferably 18 or more, and is preferably 50 or less, from the viewpoint of improving the long-term retention of the functional oil agent and from the viewpoint of improving the controllability of the particle size of the microcapsule.

Examples of the fatty acid ester include a fatty acid monoester of a fatty acid and a monohydric alcohol, a fatty acid diester of a fatty acid and a dihydric alcohol, a dicarboxylic acid diester of a dicarboxylic acid and a monohydric alcohol, a tricarboxylic acid triester of a tricarboxylic acid and a monohydric alcohol, and a glycerin fatty acid triester. Among these, a fatty acid monoester is preferable from the viewpoint of improving the long-term retention of the functional oil agent and from the viewpoint of improving the controllability of the particle size of the microcapsule.

The fatty acid monoester is preferably composed of a fatty acid having 8 or more and 22 or less carbon atoms and a monohydric alcohol having 1 or more and 24 or less carbon atoms.

Examples of the fatty acid constituting the fatty acid monoester include saturated or unsaturated fatty acids having 8 or more and 22 or less carbon atoms, such as 2-ethylhexanoic acid, lauric acid, myristic acid, pentadecanoic acid, palmitic acid, palmitoleic acid, Margaric acid, stearic acid, oleic acid, linoleic acid, erucic acid, arachidic acid, and behenic acid.

Examples of the monohydric alcohol constituting the fatty acid monoester include aliphatic monohydric alcohols having 1 or more and 24 or less carbon atoms, such as methanol, ethanol, n-propyl alcohol, isopropyl alcohol, n-butyl alcohol, isobutyl alcohol, n-pentyl alcohol, isopentyl alcohol, neopentyl alcohol, hexanol, heptanol, octanol, 2-ethylhexyl alcohol, nonanol, isononyl alcohol, decanol, isodecyl alcohol, dodecanol, lauryl alcohol, tridecanol, myristyl alcohol, pentadecanol, cetyl alcohol, stearyl alcohol, isostearyl alcohol, oleyl alcohol, behenyl alcohol, and 2-octyldodecanol.

Examples of the fatty acid monoester include cetyl 2-ethylhexanoate, butyl stearate, isopropyl myristate, hexadecyl myristate, 2-octyldodecyl myristate, isopropyl palmitate, hexadecyl palmitate, and 2-ethylhexyl stearate. Of these, isopropyl palmitate is preferred.
[Higher Alkane Having 6 or More Carbon Atoms]

The number of carbon atoms of the higher alkane is preferably 6 or more and 32 or less, and more preferably 10 or more and 32 or less.

Examples of the higher alkane include linear or branched, saturated or unsaturated higher alkanes having 6 or more and 32 or less carbon atoms, such as decane, undecane, dodecane, isododecane, tridecane, tetradecane, hexadecane, octadecane, eicosane, docosane, squalane, and squalene.

The component (B2) is preferably a fatty acid ester having a total number of carbon atoms of 6 or more from the viewpoint of improving the long-term retention of the functional oil agent and from the viewpoint of improving the controllability of the particle size of the microcapsule.

The content ratio of the component (B2) to the component (A) in the microcapsule of the present invention is preferably 0.01% by mass or more, more preferably 0.1% by mass or more, still more preferably 0.5% by mass or more, and even more preferably 0.7% by mass or more, and is preferably 10% by mass or less, more preferably 7% by mass or less, still more preferably 5% by mass or less, even more preferably 4% by mass or less, and yet still more preferably 3% by mass or less, from the viewpoint of improving the long-term retention of the functional oil agent and from the viewpoint of improving the controllability of the particle size of the microcapsule.

The content ratio of the component (B2) to the component (A) is a content ratio when the component (A) in the microcapsule is taken as 100% by mass.
<Shell>
(Inorganic Substance)

The shell of the microcapsule of the present invention contains an inorganic substance as a constituent component.

The inorganic substance is preferably a metal oxide containing a metal element or a metalloid element, and more preferably an inorganic polymer formed by a sol-gel reaction using a metal alkoxide [M(OR)x] as a shell precursor. Here, M is a metal or a metalloid element, and R is a hydrocarbon group.

Examples of the metal or metalloid element constituting the metal alkoxide include silicon, aluminum, titanium, zirconium, and zinc.

The inorganic substance is preferably an inorganic polymer formed by a sol-gel reaction using alkoxide of one or more metal selected from the group consisting of silicon, aluminum, and titanium as a shell precursor, and more preferably an alkoxysilane polymer, from the viewpoint of improving the long-term retention of the functional oil agent and from the viewpoint of improving the controllability of the particle size of the microcapsule.

The alkoxysilane is preferably tetraalkoxysilane from the viewpoint of improving the long-term retention of the functional oil agent and from the viewpoint of improving the controllability of the particle size of the microcapsule.

From the same viewpoint as described above, the tetraalkoxysilane is preferably tetraalkoxysilane having an alkoxy group having 1 or more and 4 or less carbon atoms, more preferably one or more selected from the group consisting of tetramethoxysilane, tetraethoxysilane, and tetraisopropoxysilane, still more preferably one or more selected from the group consisting of tetramethoxysilane and tetraethoxysilane, and even more preferably tetraethoxysilane.

[Method for Producing Microcapsule]

The microcapsule of the present invention is obtained by a production method including a step of emulsifying an oil-water mixture containing an oil-phase component containing the following component (A), component (B1), and component (C) and an aqueous phase component and subjecting the resulting mixture to a sol-gel reaction to form the microcapsule (hereinafter also referred to as "Step I").

Component (A): a functional oil agent.

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded).

Component (C): a shell precursor.

<Oil-Water Mixture>

In the production method of the present invention, the component (A) and the component (B1) are as described above.

Since the component (B1) has a long-chain aliphatic hydrocarbon group and a polar group, it is considered that the component functions as an emulsification aid at the time of emulsification of an oil-water mixture, and formation of stable and fine emulsified droplets can proceed rapidly. Therefore, it is considered that the breakage of the shell due to the long-time application of the mechanical force can be suppressed, a shell forming site suitable as a template for the microcapsule can be provided, the long-term retention of the organic compound is improved, and further, the controllability of the particle size of the microcapsule is improved.

The oil phase component of the oil-water mixture preferably further contains the above-described component (B2) from the viewpoint of improving the long-term retention of the functional oil agent and from the viewpoint of improving the controllability of the particle size of the microcapsule.

In the present invention, it is considered that the component (B2) functions as a particle size stabilizer for stabilizing the particle size of the emulsified droplets serving as a template for the microcapsule.

It is considered that the component (B2) contributes to suppression of instability of the emulsified droplets due to Ostwald ripening in which a relatively hydrophilic component as an oil phase component in the emulsified droplets molecularly diffuse into the aqueous phase as a continuous phase, suppresses coarsening of the emulsified droplets over time, and can stabilize the particle size of the emulsified droplets serving as a template for the microcapsule. Therefore, it is considered that, by using the component (B2) in combination with the component (B1), it is possible to provide a shell forming site suitable as a template for the microcapsule, the long-term retention of the organic compound is improved, and the controllability of the particle size of the microcapsule is improved. From this point of view, as described above, the c log P value of the component (B2) is preferably 4 or more, more preferably 5 or more, still more preferably 6 or more, and even more preferably 7 or more, and is preferably 10 or less, and more preferably 9 or less.

In addition to the function as an emulsification aid, the component (B1) may also have a function as a particle size stabilizer for stabilizing the particle size of emulsified droplets serving as a template for the microcapsule. From this point of view, the component (B1) is preferably one or more selected from the group consisting of a higher fatty acid having 6 or more carbon atoms and a higher aliphatic alcohol having 6 or more carbon atoms, and more preferably a higher fatty acid having 6 or more carbon atoms.

Further, the c Log P value of the component (B1) is preferably 4 or more, more preferably 5 or more, and still more preferably 6 or more, and is preferably 10 or less, and more preferably 9 or less, from the viewpoint of improving the long-term retention of the functional oil agent.

The c Log P value of the component (B1) is preferably 4 or more, more preferably 5 or more, still more preferably 6 or more, and even more preferably 7 or more, and is preferably 10 or less, and more preferably 9 or less, from the viewpoint of improving the controllability of the particle size of the microcapsule.

The amount of the component (B2) used in the production method of the present invention is preferably 20% by mass or less, more preferably 10% by mass or less, still more preferably 5% by mass or less, even more preferably 1% by mass or less, and yet still more preferably 0.5% by mass or less, and is preferably 0.05% by mass or more, more preferably 0.1% by mass or more, and still more preferably 0.15% by mass or more, with respect to the total amount of the oil-water mixture, from the viewpoint of not inhibiting the movement of the shell precursor to the oil-water interface and the formation of the shell in the system.

Here, the amount of the component (B2) is an amount when the total amount of the oil-water mixture is taken as 100% by mass.

(Component (C))

The oil phase component of the oil-water mixture contains a shell precursor as a component (C).

As described above, the component (C) is a substance capable of forming a shell of a microcapsule, and is preferably a metal alkoxide [M(OR)x]. Here, M and R are the same as described above.

Examples of the metal or metalloid element constituting the metal alkoxide include silicon, aluminum, titanium, zirconium, and zinc.

The component (C) is preferably alkoxide of one or more metal selected from the group consisting of silicon, aluminum, and titanium, and more preferably an alkoxysilane, from the viewpoint of improving the long-term retention of the functional oil agent and from the viewpoint of improving the controllability of the particle size of the microcapsule.

The alkoxysilane is preferably tetraalkoxysilane from the viewpoint of improving the long-term retention of the functional oil agent and from the viewpoint of improving the controllability of the particle size of the microcapsule.

From the same viewpoint as described above, the tetraalkoxysilane is preferably tetraalkoxysilane having an alkoxy group having 1 or more and 4 or less carbon atoms, more preferably one or more selected from the group consisting of tetramethoxysilane, tetraethoxysilane, and tetraisopropoxysilane, still more preferably one or more selected from the group consisting of tetramethoxysilane and tetraethoxysilane, and even more preferably tetraethoxysilane.

The amount of the component (C) used in the production method of the present invention is preferably 10% by mass or more, more preferably 15% by mass or more, and still more preferably 20% by mass or more from the viewpoint of forming a shell capable of surrounding the periphery of the oil-phase emulsified droplet containing the functional oil agent, and is preferably 100% by mass or less, more preferably 70% by mass or less, still more preferably 50% by mass or less, and even more preferably 30% by mass or less from the viewpoint of suppressing the residue of the shell precursor inside the oil-phase droplet and efficiently progressing the conversion to the shell, with respect to the amount of the component (A).

Here, the amount of the component (C) is an amount when the amount of the component (A) is taken as 100% by mass.

(Cationic Surfactant)

The aqueous phase component of the oil-water mixture preferably contains a cationic surfactant from the viewpoint of improving the long-term retention of the functional oil agent and from the viewpoint of improving the controllability of the particle size of the microcapsule.

Examples of the cationic surfactant include an alkylamine salt and an alkyl quaternary ammonium salt. The number of carbon atoms of the alkyl group in the alkylamine salt and the alkyl quaternary ammonium salt is preferably 6 or more, more preferably 8 or more, still more preferably 10 or more, even more preferably 12 or more, and yet still more preferably 14 or more, and is preferably 22 or less, more preferably 20 or less, and still more preferably 18 or less.

Examples of the alkylamine salt include alkylamine acetates such as laurylamine acetate and stearylamine acetate.

Examples of the alkyl quaternary ammonium salt include an alkyltrimethylammonium salt, a dialkyldimethylammonium salt, and an alkylbenzyldimethylammonium salt.

Examples of the alkyltrimethylammonium salt include alkyltrimethylammonium chlorides such as lauryltrimethylammonium chloride, cetyltrimethylammonium chloride, and stearyltrimethylammonium chloride; and alkyltrimethylammonium bromides such as lauryltrimethylammonium bromide, cetyltrimethylammonium bromide, and stearyltrimethylammonium bromide.

Examples of the dialkyldimethylammonium salt include dialkyldimethylammonium chlorides such as distearyldimethylammonium chloride; and dialkyldimethylammonium bromides such as distearyldimethylammonium bromide.

Examples of the alkylbenzyldimethylammonium salt include alkylbenzyldimethylammonium chloride and alkylbenzyldimethylammonium bromide.

The cationic surfactants may be used alone or in combination of two or more thereof.

Among these, the cationic surfactant is preferably a quaternary ammonium salt, more preferably an alkyltrimethylammonium salt having an alkyl group having 6 or more and 22 or less carbon atoms, still more preferably one or more selected from the group consisting of lauryltrimethylammonium chloride, stearyltrimethylammonium chloride, and cetyltrimethylammonium chloride, and even more preferably cetyltrimethylammonium chloride.

The amount of the cationic surfactant used in the production method of the present invention is preferably 0.1% by mass or more, more preferably 0.2% by mass or more, and still more preferably 0.3% by mass or more, and is preferably 5% by mass or less, more preferably 3% by mass or less, and still more preferably 1% by mass or less, from the viewpoint of obtaining a stable emulsified liquid, with respect to the amount of the component (A).

In the case where the aqueous phase of the oil-water mixture contains a cationic surfactant, it is considered that the use of the component (B1) in combination with the cationic surfactant improves the ability to lower the dynamic surface tension of the system, and it is considered that the formation of stable and fine emulsified droplets can proceed rapidly. The molecular weight of the component (B1) is, as described above, preferably 500 or less, more preferably 450 or less, still more preferably 400 or less, and even more preferably 350 or less, from the viewpoint of improving the ability to lower the dynamic surface tension of the system.

The amount of the oil phase component with respect to the total amount of the oil-water mixture is preferably 5% by mass or more, more preferably 10% by mass or more, and still more preferably 15% by mass or more from the viewpoint of production efficiency and is preferably 50% by mass or less, more preferably 45% by mass or less, and still more preferably 40% by mass or less from the viewpoint of obtaining a stable emulsified liquid.

In the present invention, the order of mixing the components of the oil-water mixture is not particularly limited. For example, after adding the component (B1), the component (A) and, if necessary the component (B2) and the component (C) may be mixed, or an aqueous phase component and an oil phase component prepared in advance may be mixed.

When the component of the oil-water mixture is solid, heating may be performed at the time of mixing.

In the present invention, the oil-water mixture is preferably prepared by a method including the following Step 1 to Step 3.

Step 1: a step of preparing an aqueous phase component containing a cationic surfactant.

Step 2: a step of preparing an oil phase component by mixing the component (A) and the component (B1), and if necessary, the component (B2) and the component (C).

Step 3: a step of obtaining an oil-water mixture by adding the oil phase component obtained in Step 2 to the aqueous phase component obtained in Step 1.

The oil-water mixture is emulsified and then subjected to a sol-gel reaction.

The stirring unit used for emulsifying the oil-water mixture is not particularly limited, and a homogenizer having a shearing force, a high-pressure dispersing machine, an ultrasonic dispersing machine, or the like can be used. Further, a homomixer, "DISPER" (trade name, manufactured by PRIMIX Corporation), "CLEARMIX" (trade name, manufactured by M Technique Co. Ltd.), "Cavitron" (trade name, manufactured by Pacific Machinery & Engineering Co. Ltd.), or the like can also be used.

The temperature at the time of emulsification of the oil-water mixture is preferably 5° C. or higher, more preferably 8° C. or higher, still more preferably 10° C. or higher, and even more preferably 15° C. or higher, and is preferably 50° C. or lower, more preferably 40° C. or lower, still more preferably 35° C. or lower, and even more preferably 30° C. or lower.

It is preferable that the rotation speed of the stirring unit and the time at the time of emulsification of the oil-water mixture are appropriately adjusted so that a median diameter $D_{50}$ of the emulsified droplets of the emulsified liquid is in the range described below.

The median diameter $D_{50}$ of the emulsified droplets of the emulsified liquid obtained by emulsifying the oil-water mixture is preferably 0.1 μm or more, more preferably 0.2 μm or more, and still more preferably 0.3 μm or more from the viewpoint of reducing the specific surface area relative to the environment outside the microcapsule and improving the long-term retention of the functional oil agent, and is preferably 50 μm or less, more preferably 30 μm or less, still more preferably 10 μm or less, even more preferably 5 μm or less, and yet still more preferably 3 μm or less from the viewpoint of improving the physical strength of the microcapsule and improving the long-term retention of the functional oil agent, and from the viewpoint of improving the controllability of the particle size of the microcapsule.

The median diameter $D_{50}$ can be measured by the method described in Examples.

<Sol-Gel Reaction>

The initial pH of the sol-gel reaction in Step I is preferably 3.0 or more, more preferably 3.3 or more, and still more preferably 3.5 or more from the viewpoint of maintaining the balance between the hydrolysis reaction and the condensation reaction of the shell precursor and from the viewpoint of suppressing the formation of a highly hydrophilic sol and promoting the progress of encapsulation, and is preferably 4.5 or less, more preferably 4.3 or less, and still more preferably 4.1 or less from the viewpoint of suppressing the formation of a shell accompanied with the aggregation of emulsified droplets and obtaining a microcapsule having a dense shell.

In order to adjust the initial pH of the sol-gel reaction to a desired range, an arbitrary acidic or alkaline pH adjuster is preferably added to the emulsified liquid depending on the strength of acidity or alkalinity of the oil phase component containing the component (A) and the component (B1).

When the pH of the emulsified liquid becomes a desired value or less, it is preferable to adjust the pH using an alkaline pH adjuster.

When the pH of the emulsified liquid becomes a desired value or more, it is preferable to adjust the pH using an acidic pH adjuster.

Examples of the acidic pH adjuster include inorganic acids such as sulfuric acid, sulfurous acid, hydrochloric acid, and nitric acid; organic acids such as aromatic sulfonic acid compounds such as p-toluenesulfonic acid and benzenesulfonic acid, aliphatic sulfonic acid compounds such as methanesulfonic acid, and citric acid; and liquids obtained by adding a cation exchange resin or the like to water, ethanol, or the like.

Examples of the alkaline pH adjuster include alkali metal hydroxides such as sodium hydroxide and potassium hydroxide; alkali metal hydrogencarbonates such as sodium hydrogencarbonate; ammonia; ammonium hydroxide; and organic amines such as diethanolamine, triethanolamine, and trishydroxymethylaminomethane. Among these, one or more selected from the group consisting of sodium hydroxide and ammonium hydroxide are preferable.

The pH adjuster may be used alone or in combination of two or more thereof.

The reaction temperature of the sol-gel reaction in Step I can be selected to any value as long as it is the melting point or higher and the boiling point or lower of water contained as the dispersion medium, but it is preferably adjusted to 5° C. or higher, more preferably 10° C. or higher, and still more preferably 15° C. or higher, and is preferably 60° C. or lower, more preferably 50° C. or lower, and still more preferably 40° C. or lower in order to control the balance between the hydrolysis reaction and the condensation reaction in the sol-gel reaction and to form a dense and strong shell.

In the present invention, the microcapsules obtained in Step I are obtained as a water dispersion containing the microcapsules dispersed in water.

In the present invention, depending on the use of the microcapsules, the microcapsules can be used as they are as a water dispersion, but the microcapsules may be separated from the water dispersion and used according to the intended use of the microcapsules. As the separation method, a filtration method, a centrifugation method, or the like can be employed.

In the present invention, it is preferable to further include a step of further adding a component (C) to the water dispersion containing the microcapsule obtained in Step I to perform a sol-gel reaction, thereby forming a microcapsule having a shell for further clathrating the microcapsule (hereinafter, also referred to as "Step II"), from the viewpoint of improving the long-term retention of the functional oil agent.

Hereinafter, the shell formed in Step I is also referred to as a "first shell", and the shell formed in Step II is also referred to as a "second shell".

The temperature of the sol-gel reaction in Step II may be the same as that in Step I.

The amount of the component (C) in Step II is preferably 3% by mass or more, more preferably 5% by mass or more, and still more preferably 10% by mass or more from the viewpoint of improving the long-term retention of the functional oil agent, and is preferably 50% by mass or less, more preferably 30% by mass or less, and still more preferably 20% by mass or less from the viewpoint of suppressing the residue of the shell precursor inside the oil-phase droplet and efficiently progressing the conversion to the shell, with respect to the amount of the component (A).

The median diameter $D_{50}$ of the microcapsule of the present invention varies depending on the type of shell, but in the case of, for example, a silica capsule, it is preferably 0.1 μm or more, more preferably 0.5 μm or more, and still more preferably 0.7 μm or more from the viewpoint of improving the long-term retention of the functional oil agent and from the viewpoint of improving the dispersion stability of the silica capsule, and is preferably 50 μm or less, more preferably 30 μm or less, still more preferably 10 μm or less, and even more preferably 5 μm or less from the viewpoint of improving the physical strength of the silica capsule and improving the long-term retention of the functional oil agent, and from the viewpoint of improving the controllability of the particle size of the microcapsule.

The median diameter $D_{50}$ of the microcapsule can be measured by the method described in Examples.

The microcapsule of the present invention can be used in various applications, and for example, can be suitably used in various applications such as cosmetics such as a milky lotion, a cosmetic liquid, a cosmetic water, a beauty serum, a cream, a gel formulation, a hair treatment agent, and quasi-drugs, fiber treatment agents such as a detergent, a softener, and an anti-wrinkle spray, sanitary products such as paper diapers, and air fresheners.

The microcapsule of the present invention can be used by being blended with a composition such as a detergent composition, a fiber treatment agent composition, a cosmetic composition, an air freshener composition, and a deodorant composition. As the composition, a detergent composition such as a powder detergent composition and a liquid detergent composition, and a fiber treatment agent composition such as a softener composition are preferred, a fiber treatment agent composition is more preferred, and a softener composition is still more preferred.

With respect to the above-mentioned embodiments, the present invention further discloses the following microcapsules and methods for producing the microcapsules.

<1> A microcapsule having a shell containing an inorganic substance as a constituent component and a core containing one or more organic compounds inside the shell, in which the organic compound contains the following component (A) and component (B1):

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded).

<2> The microcapsule as set forth in <1>, in which the molecular weight of the component (B1) is preferably 500 or less, more preferably 450 or less, still more preferably 400 or less, and even more preferably 350 or less, and is preferably 150 or more.

<3> The microcapsule as set forth in <1> or <2>, in which the component (B1) is preferably one or more selected from the group consisting of a higher fatty acid having 6 or more carbon atoms and a higher aliphatic alcohol having 6 or more carbon atoms, and more preferably a higher fatty acid having 6 or more carbon atoms.

<4> The microcapsule as set forth in <1> or <2>, in which the component (B1) is preferably one or more selected from the group consisting of an alkyl glyceryl ether having an alkyl group having 8 or more carbon atoms and a higher fatty acid having 6 or more carbon atoms, and more preferably an alkyl glyceryl ether having an alkyl group having 8 or more carbon atoms.

<5> The microcapsule as set forth in any of <1> to <4>, in which the content ratio of the component (B1) to the component (A) is preferably 0.01% by mass or more, more preferably 0.1% by mass or more, still more preferably 0.5% by mass or more, and even more preferably 1% by mass or more, and is preferably 10% by mass or less, more preferably 7% by mass or less, still more preferably 5% by mass or less, and even more preferably 4% by mass or less.

<6> The microcapsule as set forth in any of <1> to <5>, in which the organic compound further contains the following component (B2):

Component (B2): one or more selected from the group consisting of a fatty acid ester having a total number of carbon atoms of 6 or more and a higher alkane having 6 or more carbon atoms (provided that the component (A) is excluded).

<7> The microcapsule as set forth in <6>, in which the c Log P value of the component (B2) is preferably 4 or more, more preferably 5 or more, still more preferably 6 or more, and even more preferably 7 or more, and is preferably 10 or less, and more preferably 9 or less.

<8> The microcapsule as set forth in <6> or <7>, in which the component (B2) is preferably a fatty acid ester having a total number of carbon atoms of 6 or more.

<9> The microcapsule as set forth in any of <6> to <8>, in which the content ratio of the component (B2) to the component (A) is preferably 0.01% by mass or more, more preferably 0.1% by mass or more, still more preferably 0.5% by mass or more, and even more preferably 0.7% by mass or more, and is preferably 10% by mass or less, more preferably 7% by mass or less, still more preferably 5% by mass or less, even more preferably 4% by mass or less, and yet still more preferably 3% by mass or less.

<10> The microcapsule as set forth in any of <1> to <9>, in which the component (A) is preferably one or more selected from the group consisting of a fragrance, a fragrance precursor, a moisturizer, an antioxidant, an antibacterial agent, a fertilizer, a surface modifier for fibers, skin, hair, and the like, a cold sense agent, a dye, a pigment, silicone, and an oil-soluble polymer, more preferably one or more selected from the group consisting of a fragrance, a fragrance precursor, a moisturizer, an antioxidant, an antibacterial agent, a fertilizer, and a surface modifier, still more preferably one or more selected from the group consisting of a fragrance, a fragrance precursor, a moisturizer, and an antioxidant, even more preferably one or more selected from the group consisting of a fragrance, a fragrance precursor, and a moisturizer, and yet still more preferably one or more selected from the group consisting of a fragrance and a fragrance precursor.

<11> The microcapsule as set forth in any of <1> to <10>, in which the c Log P value of the component (A) is preferably 1 or more, more preferably 2 or more, and still more preferably 3 or more, and is preferably 30 or less, more preferably 20 or less, and still more preferably 10 or less.

<12> The microcapsule as set forth in any of <1> to <11>, in which the inorganic substance is preferably an inorganic polymer formed by a sol-gel reaction using alkoxide of one or more metal selected from the group consisting of silicon, aluminum, and titanium as a shell precursor, and more preferably an alkoxysilane polymer.

<13> The microcapsule as set forth in any of <1> to <12>, in which the median diameter $D_{50}$ of the microcapsule is preferably 0.1 μm or more, more preferably 0.5 μm or more, and still more preferably 0.7 μm or more, and is preferably 50 μm or less, more preferably 30 μm or less, still more preferably 10 μm or less, and even more preferably 5 μm or less.

<14> A method for producing a microcapsule having a shell containing an inorganic substance as a constituent component and a core containing one or more organic compounds inside the shell, the method including a step of emulsifying an oil-water mixture containing an oil-phase component containing the following component (A), component (B1), and component (C) and an aqueous phase component and subjecting the resulting mixture to a sol-gel reaction to form the microcapsule:

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded);

Component (C): a shell precursor.

<15> The method for producing a microcapsule as set forth in <14>, in which the oil phase component of the oil-water mixture further contains the following component (B2):

Component (B2): one or more selected from the group consisting of a fatty acid ester having a total number of carbon atoms of 6 or more and a higher alkane having 6 or more carbon atoms (provided that the component (A) is excluded).

<16> The method for producing a microcapsule as set forth in <15>, in which the amount of the component (B2)

is preferably 5% by mass or less, more preferably 3% by mass or less, still more preferably 1% by mass or less, even more preferably 0.7% by mass or less, and yet still more preferably 0.5% by mass or less, and is preferably 0.05% by mass or more, more preferably 0.1% by mass or more, and still more preferably 0.15% by mass or more, with respect to the total amount of the oil-water mixture.

<17> The method for producing a microcapsule as set forth in any of <14> to <16>, in which the component (C) is preferably alkoxide of one or more metal selected from the group consisting of silicon, aluminum, and titanium, and more preferably alkoxysilane.

<18> The method for producing a microcapsule as set forth in any of <14> to <17>, in which the amount of the component (C) is preferably 10% by mass or more, more preferably 15% by mass or more, and still more preferably 20% by mass or more, and is preferably 100% by mass or less, more preferably 70% by mass or less, still more preferably 50% by mass or less, and even more preferably 30% by mass or less, with respect to the amount of the component (A).

<19> The method for producing a microcapsule as set forth in any of <14> to <18>, in which the aqueous phase component of the oil-water mixture contains a cationic surfactant.

<20> The method for producing a microcapsule as set forth in any of <14> to <19>, in which the median diameter $D_{50}$ of emulsified droplets of an emulsified liquid obtained by emulsifying the oil-water mixture is preferably 0.1 μm or more, more preferably 0.2 μm or more, and still more preferably 0.3 μm or more, and is preferably 50 μm or less, more preferably 30 μm or less, still more preferably 10 μm or less, even more preferably 5 μm or less, and yet still more preferably 3 μm or less.

<21> A microcapsule having a shell containing an alkoxysilane polymer as a constituent component and a core containing one or more organic compounds inside the shell, in which the organic compound contains the following component (A) and component (B1):

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded);

the molecular weight of the component (B1) is 500 or less and the content ratio of the component (B1) to the component (A) is 0.01% by mass or more and 10% by mass or less.

<22> The microcapsule as set forth in <21>, in which the c Log P value of the component (A) is preferably 1 or more, more preferably 2 or more, and still more preferably 3 or more, and is preferably 30 or less, more preferably 20 or less, and still more preferably 10 or less.

<23> A microcapsule having a shell containing an alkoxysilane polymer as a constituent component and a core containing one or more organic compounds inside the shell, in which the organic compound contains the following component (A), component (B1), and component (B2):

Component (A): a functional oil agent;

Component (B1): one or more selected from the group consisting of a higher aliphatic alcohol having 6 or more carbon atoms, a higher fatty acid having 6 or more carbon atoms, a monoalkyl glyceryl ether having an alkyl group having 6 or more carbon atoms, and an amide compound having an alkyl group having 8 or more carbon atoms (provided that the component (A) is excluded);

Component (B2): one or more selected from the group consisting of a fatty acid ester having a total number of carbon atoms of 6 or more and a higher alkane having 6 or more carbon atoms (provided that the component (A) is excluded);

the content ratio of the component (B1) to the component (A) is 0.01% by mass or more and 10% by mass or less, and the content ratio of the component (B2) to the component (A) is 0.01% by mass or more and 10% by mass or less.

<24> The microcapsule as set forth in <23>, in which the molecular weight of the component (B1) is preferably 500 or less, more preferably 450 or less, still more preferably 400 or less, and even more preferably 350 or less, and is preferably 150 or more.

<25> The microcapsule as set forth in <23> or <24>, in which the c Log P value of the component (B2) is preferably 4 or more, more preferably 5 or more, still more preferably 6 or more, and even more preferably 7 or more, and is preferably 10 or less, and more preferably 9 or less.

<26> The microcapsule as set forth in any of <23> to <25>, in which the c Log P value of the component (A) is preferably 1 or more, more preferably 2 or more, and still more preferably 3 or more, and is preferably 30 or less, more preferably 20 or less, and still more preferably 10 or less.

EXAMPLES

Various measurements used in Examples and Comparative Examples were performed by the following methods.

[Median Diameter $D_{50}$]

The median diameter $D_{50}$ of emulsified droplets and the median diameter $D_{50}$ of microcapsules were measured by using a laser diffraction/scattering particle size distribution measuring apparatus "LA-960" (trade name, manufactured by HORIBA, Ltd.). For the measurement, a flow cell was used, the medium was water, and the index of refraction was set to 1.45-0i. An emulsified liquid or a water dispersion containing silica capsules was added to the flow cell, and the measurement was carried out at a concentration at which a transmittance of around 90% was exhibited so as to obtain the median diameter $D_{50}$ on a volume basis.

<Model Fragrance>

As components (A) to be encapsulated in microcapsules, a model fragrance A1 having a composition shown in Table 1 (volume average c Log P value: 3.7, specific weight: 0.97, oil-water interface tension: 17.0 mN/m) and a model fragrance A2 having a composition shown in Table 2 (volume average c Log P value: 3.7, specific weight: 0.97, oil-water interface tension: 16.3 mN/m) were used. The volume average c Log P value of the model fragrance was calculated as the sum of the c Log P values of the fragrance components contained in the model fragrance, each multiplied by the volume ratio in the model fragrance.

TABLE 1

| Model fragrance A1 | | |
| --- | --- | --- |
| Fragrance component name | Content (% by mass) | cLogP |
| Methyl dihydrojasmonate | 20.6 | 3.0 |
| γ-decalactone | 13.5 | 2.6 |

TABLE 1-continued

| Model fragrance A1 | | |
| --- | --- | --- |
| Fragrance component name | Content (% by mass) | cLogP |
| Ethylene brassylate | 12.0 | 4.7 |
| o-t.B.C.H. Acetate | 11.0 | 4.4 |
| 1-(2-Ter-Butyl cyclohexyloxy)-2-butanol *1 | 8.0 | 4.1 |
| Others | 34.9 | 3.9 |

*1: Amber Core (trade name, manufactured by Kao Corporation)

TABLE 2

| Model fragrance A2 | | |
| --- | --- | --- |
| Fragrance component name | Content (% by mass) | cLogP |
| Methyl dihydrojasmonate | 20.2 | 3.0 |
| γ-decalactone | 13.5 | 2.6 |
| Ethylene brassylate | 12.0 | 4.7 |
| o-t.B.C.H. Acetate | 11.0 | 4.4 |
| 1-(2-Ter-Butyl cyclohexyloxy)-2-butanol *1 | 8.8 | 4.1 |
| Others | 34.5 | 3.9 |

* 1: Amber Core (trade name, manufactured by Kao Corporation)

Details of the compounds used in Examples and Comparative Examples are as follows.

Cetyl alcohol: manufactured by Kao Corporation, c Log P value: 6.7, melting point: 49 to 52° C.

Isostearic acid: manufactured by Kokyu Alcohol Kogyo Co., Ltd., c Log P value: 7.9, melting point: cloud point of 10° C. or lower Batyl alcohol (α-monostearyl glyceryl ether): manufactured by Tokyo Chemical Industry Co., Ltd., c Log P value: 7.2, melting point: 71° C.

Isopropyl palmitate: manufactured by Kao Corporation, c Log P value: 8.2, melting point: 8 to 15° C.

Example 1

(Step I)

0.60 g of QUARTAMIN 60W (trade name, manufactured by Kao Corporation; cetyltrimethylammonium chloride (indicated as "CTAC" in Table 3 below), active ingredient 30% by mass) was diluted with 149.40 g of ion-exchanged water to prepare an aqueous phase component. To this aqueous phase component, an oil phase component prepared by premixing 38.4 g of the model fragrance A1 as component (A), 10 g of tetraethoxysilane (hereinafter referred to as "TEOS") as component (C), 1.2 g of cetyl alcohol as component (B1), and 0.4 g of isopropyl palmitate as component (B2) was added to obtain an oil-water mixture.

The obtained oil-water mixture was emulsified at room temperature (about 25° C.) for 8 minutes using a homomixer (manufactured by HsiangTai Machinery Industry Co., Ltd., model: HM-310) set at a rotation speed of 8,500 rpm, thereby obtaining an emulsified liquid. The median diameter $D_{50}$ of the emulsified droplets at this time was 1.1 μm.

Next, the pH of the emulsified liquid was adjusted to 3.7 with a 1% by mass sulfuric acid aqueous solution, and then the emulsified liquid was transferred to a separable flask equipped with a stirring blade and stirred in a 200 rpm for 24 hours while maintaining the liquid temperature at 30° C. to obtain a water dispersion (1) containing silica capsules each having a core composed of the component (A), the component (B1), and the component (B2) and a shell composed of silica. The median diameter $D_{50}$ of the silica capsules of the water dispersion (1) was 1.7 μm.

Example 2

(Step I)

0.60 g of QUARTAMIN 60W (trade name, manufactured by Kao Corporation; cetyltrimethylammonium chloride, active ingredient 30% by mass) was diluted with 149.40 g of ion-exchanged water to prepare an aqueous phase component. To this aqueous phase component, an oil phase component prepared by premixing 38.8 g of the model fragrance A2 as component (A), 10 g of TEOS as component (C), and 1.2 g of cetyl alcohol as component (B1) was added to obtain an oil-water mixture.

The obtained oil-water mixture was emulsified at room temperature (about 25° C.) for 8 minutes using the homomixer set at a rotation speed of 8,500 rpm, thereby obtaining an emulsified liquid. The median diameter $D_{50}$ of the emulsified droplets at this time was 1.0 μm.

Next, the pH of the emulsified liquid was adjusted to 3.7 with a 1% by mass sulfuric acid aqueous solution, and then the emulsified liquid was transferred to a separable flask equipped with a stirring blade and stirred in a 200 rpm for 24 hours while maintaining the liquid temperature at 30° C. to obtain a water dispersion (2) containing silica capsules each having a core composed of the component (A) and the component (B1) and a shell composed of silica. The median diameter $D_{50}$ of the silica capsules of the water dispersion (2) was 2.2 μm.

Comparative Example 1

(Step I')

0.60 g of QUARTAMIN 60W (trade name, manufactured by Kao Corporation; cetyltrimethylammonium chloride, active ingredient 30% by mass) was diluted with 149.40 g of ion-exchanged water to prepare an aqueous phase component. To this aqueous phase component, an oil phase component prepared by mixing 40 g of the model fragrance A1 as component (A) and 10 g of TEOS as component (C)) was added to obtain an oil-water mixture.

The obtained oil-water mixture was emulsified at room temperature (about 25° C.) for 8 minutes using the homomixer set at a rotation speed of 8,500 rpm, thereby obtaining an emulsified liquid. The median diameter $D_{50}$ of the emulsified droplets at this time was 2.0 μm.

Next, the pH of the emulsified liquid was adjusted to 3.7 with a 1% by mass sulfuric acid aqueous solution, and then the emulsified liquid was transferred to a separable flask equipped with a stirring blade and stirred in a 200 rpm for 24 hours while maintaining the liquid temperature at 30° C. to obtain a water dispersion (C1) containing silica capsules each having a core composed of the component (A) and a shell composed of silica. The median diameter $D_{50}$ of the silica capsules of the water dispersion (C1) was 2.6 μm.

Example 3

(Step I)

A water dispersion (1) containing silica capsules was obtained in the same manner as in Step I of Example 1.

(Step II)

Next, to 150 g of the water dispersion (1), 4.5 g of TEOS was additionally added over 7 hours using a dropping pump "Atlas syringe pump" (trade name, Syrris Ltd.), followed by stirring for 24 hours while maintaining the liquid temperature at 30° C. and cooling to room temperature to form second shells for clathrating the silica capsules, thereby obtaining a water dispersion (3) containing silica capsules in which the component (A), the component (B1), and the component (B2) were encapsulated with amorphous silica. The median diameter $D_{50}$ of the silica capsules of the water dispersion (3) was 1.9 μm.

Example 4

(Step I)

A water dispersion (2) containing silica capsules was obtained in the same manner as in Step I of Example 2.

(Step II)

Next, to 150 g of the water dispersion (2), 4.5 g of TEOS was additionally added over 7 hours using the dropping pump, followed by stirring for 24 hours while maintaining the liquid temperature at 30° C. and cooling to room temperature to form second shells for clathrating the silica capsules, thereby obtaining a water dispersion (4) containing silica capsules in which the component (A) and the component (B1) were encapsulated with amorphous silica. The median diameter $D_{50}$ of the silica capsules of the water dispersion (4) was 2.2 μm.

Example 5

(Step I)

0.60 g of QUARTAMIN 60W (trade name, manufactured by Kao Corporation; cetyltrimethylammonium chloride, active ingredient 30% by mass) was diluted with 149.40 g of ion-exchanged water to prepare an aqueous phase component. To this aqueous phase component, an oil phase component prepared by premixing 38.8 g of the model fragrance A2 as component (A), 10 g of TEOS as component (C), and 1.2 g of isostearic acid as component (B1) was added to obtain an oil-water mixture.

The obtained oil-water mixture was emulsified at room temperature (about 25° C.) for 15 minutes using the homomixer set at a rotation speed of 8,000 rpm, thereby obtaining an emulsified liquid. The median diameter $D_{50}$ of the emulsified droplets at this time was 0.7 μm.

Next, the pH of the emulsified liquid was adjusted to 3.7 with a 1% by mass sulfuric acid aqueous solution, and then the emulsified liquid was transferred to a separable flask equipped with a stirring blade and stirred in a 200 rpm for 24 hours while maintaining the liquid temperature at 30° C. to obtain a water dispersion (5') containing silica capsules each having a core composed of the component (A) and the component (B1) and a first shell composed of silica.

(Step II)

Next, to the water dispersion (5'), 5.5 g of TEOS was additionally added over 7 hours using the dropping pump, followed by stirring for 17 hours and cooling to room temperature to form second shells for clathrating the silica capsules, thereby obtaining a water dispersion (5) containing silica capsules in which the component (A) and the component (B1) were encapsulated with amorphous silica. The median diameter $D_{50}$ of the silica capsules of the water dispersion (5) was 0.9 μm.

Example 6

(Step I)

0.61 g of QUARTAMIN 60W (trade name, manufactured by Kao Corporation; cetyltrimethylammonium chloride, active ingredient 30% by mass) was diluted with 149.11 g of ion-exchanged water to prepare an aqueous phase component. To this aqueous phase component, an oil phase component prepared by premixing 38.9 g of the model fragrance A2 as component (A), 10 g of TEOS as component (C), and 1.2 g of batyl alcohol as component (B1) was added to obtain an oil-water mixture.

The obtained oil-water mixture was emulsified at room temperature (about 25° C.) for 8 minutes using the homomixer set at a rotation speed of 8,500 rpm, thereby obtaining an emulsified liquid. The median diameter $D_{50}$ of the emulsified droplets at this time was 0.7 μm.

Next, the pH of the emulsified liquid was adjusted to 3.7 with a 1% by mass sulfuric acid aqueous solution, and then the emulsified liquid was transferred to a separable flask equipped with a stirring blade and stirred in a 200 rpm for 24 hours while maintaining the liquid temperature at 30° C. to obtain a water dispersion (6') containing silica capsules each having a core composed of the component (A) and the component (B1) and a first shell composed of silica.

(Step II)

Next, to 25.36 g of the water dispersion (6'), 0.71 g of TEOS was additionally added over 10 seconds with the dropping pump, followed by stirring for 20 hours while maintaining the liquid temperature at 30° C. and cooling to room temperature to form second shells for clathrating the silica capsules, thereby obtaining a water dispersion (6) containing silica capsules in which the component (A) and the component (B1) were encapsulated with amorphous silica. The median diameter $D_{50}$ of the silica capsules of the water dispersion (6) was 1.5 μm.

Comparative Example 2

(Step I')

0.60 g of QUARTAMIN 60W (trade name, manufactured by Kao Corporation; cetyltrimethylammonium chloride, active ingredient 30% by mass) was diluted with 149.41 g of ion-exchanged water to prepare an aqueous phase component. To this aqueous phase component, an oil phase component prepared by premixing 38.80 g of the model fragrance A1 as component (A), 10 g of TEOS as component (C), and 1.2 g of isopropyl palmitate as component (B2) was added to obtain an oil-water mixture.

The obtained oil-water mixture was emulsified at room temperature (about 25° C.) for 8 minutes using the homomixer set at a rotation speed of 8,500 rpm, thereby obtaining an emulsified liquid. The median diameter $D_{50}$ of the emulsified droplets at this time was 1.9 μm.

Next, the pH of the emulsified liquid was adjusted to 3.7 with a 1% by mass sulfuric acid aqueous solution, and then the emulsified liquid was transferred to a separable flask equipped with a stirring blade and stirred in a 200 rpm for 24 hours while maintaining the liquid temperature at 30° C. to obtain a water dispersion (C2') containing silica capsules each having a core composed of the component (A) and the component (B2) and a first shell composed of silica.

(Step II')

Next, with respect to 190.00 g of the water dispersion (C2'), stirring was performed while maintaining the liquid temperature at 30° C., 5.7 g of TEOS was additionally added over 7 hours using the dropping pump, followed by stirring for 17 hours and cooling to room temperature to form second shells for clathrating the silica capsules, thereby obtaining a water dispersion (C2) containing silica capsules in which the component (A) and the component (B2) were encapsulated with amorphous silica. The median diameter $D_{50}$ of the silica capsules of the water dispersion (C2) was 1.4 μm.

Examples 7 to 9 and Comparative Example 3

Water dispersions (7) to (9) and (C3) each containing silica capsules were obtained in the same manner as in Example 3, except that the amount of cetyl alcohol as the component (B1) or the amount of isopropyl palmitate as the component (B2) was changed to the amount shown in Table 3, and the rotation speed of the homomixer used for emulsifying the oil-water mixture and the emulsification treatment time were as shown in Table 3. The median diameter $D_{50}$ of the emulsified droplets and the median diameter $D_{50}$ of the silica capsules are shown in Table 3.

TABLE 3

| | Component (B1) | | Component (B2) | | Rotation speed of homomixer at emulsification | Median | |
|---|---|---|---|---|---|---|---|
| | Type | Addition amount (% by mass)*1 | Type | Addition amount (% by mass)*1 | (rpm)/ Emulsification treatment time (min) | diameter D50 (µm) of emulsified droplets | Median diameter D50 (µm) of microcapsules |
| Comparative Example 3 | — | 0 | — | 0 | 8500 rpm/ 8 min | 2.0 | 2.8 |
| Example 7 | Cetyl alcohol | 3 | — | 0 | 8500 rpm/ 8 min | 1.0 | 2.1 |
| Example 3 | Cetyl alcohol | 3 | Isopropyl palmitate | 1 | 8500 rpm/ 8 min | 1.1 | 1.9 |
| Example 8 | Cetyl alcohol | 3 | Isopropyl palmitate | 1.5 | 8500 rpm/ 10 min | 1.2 | 1.4 |
| Example 9 | Cetyl alcohol | 3 | Isopropyl palmitate | 3 | 8500 rpm/ 10 min | 1.1 | 1.1 |

*1Addition amount with respect to component (A) (% by mass)

From the comparison between Example 7 and Comparative Example 3 in Table 3, it is found that the median diameter $D_{50}$ of the obtained silica capsules is reduced depending on the addition amount of the component (B1).

From Examples 3, 8, and 9 in Table 3, it is found that the median diameter $D_{50}$ of the obtained silica capsules is reduced depending on the addition amount of the component (B2).

From this, according to the present invention, by adjusting the amount of the component (B1) or the component (B2), it is possible to obtain a microcapsule having a small particle size, and it is possible to control the particle size of the microcapsule. Therefore, the present invention is useful in designing the blending composition of the microcapsule according to the intended use. In addition, since it is considered that the microcapsule having a small particle size also has improved physical strength, it is considered that the collapse of the microcapsule in the distribution stage or the like is suppressed, and the storage stability is also improved.

[Evaluation of Microcapsules]

0.79 g each of the water dispersions containing the silica capsules obtained in Examples 1 to 6 and Comparative Examples 1 and 2, 1.61 g of ion-exchanged water, and 27.60 g of an unperfumed product of a softener "Flair Fragrance" (trade name) manufactured by Kao Corporation were weighed into a vial and sufficiently dispersed by shaking by hand to prepare a softener for evaluation, and the long-term retention of the fragrance component in the microcapsules in the softener was evaluated by the following method. The results are shown in Table 4 and Table 5.

First, at 40° C., 0.3 g of the softener for evaluation, which had been stored for 6 days or 7 days, was scooped up with a dropper, diluted with 120 g of a 0.2% by mass cyclohexanol aqueous solution, and then sufficiently dispersed by shaking. 50 g of the obtained diluted solution was quickly passed through a membrane filter (product name "Omnipore", model number "JAWPO4700", manufactured by Merck Millipore Corporation) to recover silica capsules on the membrane filter (in this case, if necessary, the mouth of a conical flask containing the diluted solution was immersed in a water bath set to 50° C. for 10 to 15 minutes before passing through the membrane filter). Further, the silica capsule was washed on the membrane filter with 10 mL of ion-exchanged water and then 10 mL of hexane, and then the silica capsule was immersed in 2 mL of methanol containing dodecane as an internal standard at a concentration of 20

µg/mL, and ultrasonic waves were irradiated for 60 minutes under conditions of an output of 180 W and an oscillation frequency of 42 kHz using an ultrasonic irradiation apparatus (manufactured by Branson, model "5510") to elute the fragrance in the silica capsule. Next, this solution was passed through a membrane filter (manufactured by TOYO ROSHI KAISHA, Ltd., product name "DISMIC", model "13JP020AN"), and then each fragrance contained in the obtained solution was measured using gas chromatography, and the GC peak area ratio α of each fragrance component encapsulated in the silica capsule after storage to the internal standard substance was obtained.

On the other hand, 80 mg of each of the water dispersions containing the silica capsules obtained in Examples 1 to 6 and Comparative Examples 1 and 2 was immersed in 40 mL of methanol containing dodecane as an internal standard at a concentration of 20 µg/mL, and ultrasonic waves were irradiated for 60 minutes under conditions of an output of 180 W and an oscillation frequency of 42 kHz using an ultrasonic irradiation apparatus (manufactured by Branson, model "5510") to elute the fragrance in the silica capsule. Next, this solution was passed through a membrane filter (manufactured by TOYO ROSHI KAISHA, Ltd., product name "DISMIC", model "13JP020AN"), and then each fragrance contained in the obtained solution was measured using gas chromatography, and the GC peak area ratio β of each fragrance component contained in the water dispersion containing the silica capsule before storage to the internal standard substance was obtained.

Next, the fragrance retention rate was calculated according to the following equation as the ratio of each fragrance component encapsulated in the silica capsule after long-term storage. As the fragrance retention rate is higher, the long-term retention is more excellent.

Fragrance retention rate (%)={(GC peak area ratio α of each fragrance component encapsulated in the silica capsule after storage to the internal standard)×(amount of methanol used for extraction)/(amount of water dispersion containing the silica capsule used for evaluation)}/{(GC peak area ratio β of each fragrance component contained in the water dispersion containing the silica capsule before storage to the internal standard)×(amount of methanol used for extraction)/(amount of water dispersion containing the silica capsule used for evaluation)}×100

TABLE 4

| | Step I | | | | | | | | | | | | | | |
|---|---|---|---|---|---|---|---|---|---|---|---|---|---|---|---|
| | Composition of oil-water mixture | | | | | | | | | Emulsified liquid | | | | Microcapsule | |
| | Aqueous phase component | | | Oil phase component | | | | | | Rotation speed of homo-mixer at emulsi- | | | | | Retention rate (% by mass) |
| | Cationic surfactant | | | Component (B1) | | Component (B2) | | Component (C) | | | | | | | |
| | Type | Addition amount (% by mass) *1 | Component (A) Type | Type | Addition amount (% by mass) *1 | Type | Addition amount (% by mass) *1 | Type | Addition amount (% by mass) *1 | fication (rpm)/Emulsification treatment time (min) | Median diameter D50 (μm) of emulsified droplets | pH adjuster Type | Initial pH of sol-gel reaction | Median diameter D50 (μm) | of fragrance component after storage at 40° C., for 7 days |
| Example 1 | CTAC | 0.47 | Model fragrance A1 | Cetyl alcohol | 3 | Isopropyl palmitate | 1 | TEOS | 26 | 8,500 rpm/ 8 min | 1.1 | Sulfuric acid | 3.7 | 1.7 | 33 |
| Example 2 | CTAC | 0.46 | Model fragrance A2 | Cetyl alcohol | 3 | — | 0 | TEOS | 26 | 8,500 rpm/ 8 min | 1.0 | Sulfuric acid | 3.7 | 2.2 | 22 |
| Comparative Example 1 | CTAC | 0.45 | Model fragrance A1 | — | 0 | — | 0 | TEOS | 25 | 8,500 rpm/ 8 min | 2.0 | Sulfuric acid | 3.7 | 2.6 | 12 |

*1Addition amount with respect to component (A) (% by mass)

TABLE 5

| | Step I | | | | | | | | | | | | |
|---|---|---|---|---|---|---|---|---|---|---|---|---|---|
| | Composition of oil-water mixture | | | | | | | | | Emulsified liquid | | | |
| | Aqueous phase component Cationic surfactant | | | Oil phase component | | | | | | Rotation speed of homo-mixer at emulsi- | | | |
| | | | | Component (B1) | | Component (B2) | | Component (C) | | | | | |
| | Type | Addition amount (% by mass)* 1 | Component (A) Type | Type | Addition amount (% by mass)* 1 | Type | Addition amount (% by mass)* 1 | Type | Addition amount (% by mass)* 1 | fication (rpm)/Emulsification treatment time (min) | Median diameter D50 (μm) of emulsified droplets | pH adjuster Type | Initial pH of sol-gel reaction |
| Example 3 | CTAC | 0.47 | Model fragrance A1 | Cetyl alcohol | 3 | Isopropyl palmitate | 1 | TEOS | 26 | 8,500 rpm/ 8 min | 1.1 | Sulfuric acid | 3.7 |
| Example 4 | CTAC | 0.46 | Model fragrance A2 | Cetyl alcohol | 3 | — | 0 | TEOS | 26 | 8,500 rpm/ 8 min | 1.0 | Sulfuric acid | 3.7 |
| Example 5 | CTAC | 0.46 | Model fragrance A2 | Isostearic acid | 3 | — | 0 | TEOS | 26 | 8,000 rpm/ 15 min | 0.7 | Sulfuric acid | 3.7 |
| Example 6 | CTAC | 0.47 | Model fragrance A2 | Batyl alcohol | 3 | — | 0 | TEOS | 26 | 8,500 rpm/ 8 min | 0.7 | Sulfuric acid | 3.7 |
| Comparative Example 2 | CTAC | 0.46 | Model fragrance A1 | | 0 | Isopropyl palmitate | 3 | TEOS | 26 | 8,500 rpm/ 8 min | 1.9 | Sulfuric acid | 3.7 |

TABLE 5-continued

| | | Step II | | Microcapsule | |
| --- | --- | --- | --- | --- | --- |
| | | Additional addition of component (C) | | | Retention rate (% by mass) of fragrance component |
| | Type | Addition amount (% by mass)*1 | Median diameter D50 (um) | | after storage at 40° C., for 6 days or 7 days |
| Example 3 | TEOS | 16 | 1.9 | | 95 |
| Example 4 | TEOS | 15 | 2.2 | | 79 |
| Example 5 | TEOS | 15 | 0.9 | | 76 |
| Example 6 | TEOS | 15 | 1.5 | | 96 |
| Comparative Example 2 | TEOS | 15 | 1.4 | | 27 |

*1Addition amount with respect to component (A) (% by mass)

From Table 4 and Table 5, it can be seen that the silica capsules of Examples are excellent in long-term retention of the fragrance component as compared with Comparative Examples.

In Examples, since the oil phase component of the oil-water mixture contains at least the component (B1), emulsified droplets having a median diameter $D_{50}$ smaller than that of Comparative Examples were formed even though the rotation speed of the homomixer during emulsification and the emulsification treatment time were about the same as those of Comparative Examples, and it is considered that the long-term retention of the fragrance component was improved probably because the sol-gel reaction rapidly proceeded in the stable and micronized emulsified droplets.

INDUSTRIAL APPLICABILITY

According to the present invention, it is possible to provide a microcapsule which can retain a functional oil agent such as a fragrance to be encapsulated for a long period of time and is excellent in controllability of a particle size, and a method for producing the microcapsule. In addition, according to the present invention, since the particle size is excellent in controllability, the physical strength of the silica capsule having a small particle size is improved and the stability in the distribution stage of the microcapsule is also excellent, the present invention is useful for designing a blending composition of the microcapsule according to the intended use, and the microcapsule is suitably used in various products in which a functional oil agent such as a fragrance is blended.

The invention claimed is:

1. A microcapsule, comprising:
a shell containing an inorganic substance as a constituent component and a core containing one or more organic compounds inside the shell,
wherein the organic compound comprises the following component (A) and component (B1):
component (A): a functional oil agent; and
component (B1): one or more selected from the group consisting of a higher aliphatic alcohol having 12 or more carbon atoms, a higher fatty acid having 14 or more carbon atoms, and a monoalkyl glyceryl ether having an alkyl group having 14 or more carbon atoms, other than the component (A).

2. The microcapsule according to claim 1, wherein the component (B1) has a molecular weight of 500 or less.

3. The microcapsule according to claim 1, wherein a content ratio of the component (B1) to the component (A) is 0.01% by mass or more and 10% by mass or less.

4. The microcapsule according to claim 1, wherein the organic compound further comprises the following component (B2):
component (B2): one or more selected from the group consisting of a fatty acid ester having a total number of carbon atoms of 6 or more and a higher alkane having 6 or more carbon atoms, other than the component (A).

5. The microcapsule according to claim 4, wherein the component (B2) has a c Log P value of 5 or more.

6. The microcapsule according to claim 4, wherein a content ratio of the component (B2) to the component (A) is 0.01% by mass or more and 10% by mass or less.

7. The microcapsule according to claim 1, wherein the component (A) is one or more selected from the group consisting of a fragrance, a fragrance precursor, a moisturizer, an antioxidant, an antibacterial agent, a fertilizer, and a surface modifier.

8. The microcapsule according to claim 1, wherein the inorganic substance is an inorganic polymer formed by a sol-gel reaction using an alkoxide of one or more metals selected from the group consisting of silicon, aluminum, and titanium as a precursor.

9. A microcapsule, comprising:
a shell containing an inorganic substance as a constituent component and a core containing one or more organic compounds inside the shell,
wherein the organic compound comprises the following component (A) and component (B1):
component (A): a functional oil agent;
component (B1): one or more selected from the group consisting of a higher aliphatic alcohol having 12 or more carbon atoms, a higher fatty acid having 14 or more carbon atoms, and a monoalkyl glyceryl ether having an alkyl group having 14 or more carbon atoms, other than the component (A), and
wherein the content of Component (B1) to Component (A) is 0.01% by mass or more and 7% by mass or less.

10. A microcapsule, comprising:
a shell containing an inorganic substance as a constituent component and a core containing one or more organic compounds inside the shell,
wherein the organic compound comprises the following component (A) and component (B1):
component (A): a functional oil agent;
component (B1): one or more selected from the group consisting of a higher aliphatic alcohol having 12 or more carbon atoms, a higher fatty acid having 14 or more carbon atoms, and a monoalkyl glyceryl ether having an alkyl group having 14 or more carbon atoms, other than the component (A); and component (B2): one or more selected from the group consisting of a fatty acid ester having a total number of carbon atoms of 6 or more and a higher alkane having 6 or more carbon atoms, other than the component (A), and wherein the content of Component (B1) to Component (A) is 0.01% by mass or more and 7% by mass or less.

* * * * *